Figure 1:
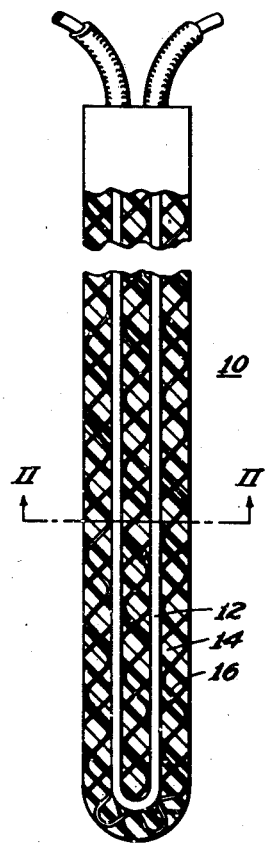

May 17, 1949.　　E. L. SCHULMAN ET AL　　2,470,653
RESISTANCE THERMOMETER
Filed Jan. 10, 1948

WITNESSES:
Robert C. Baird
Robert E. Ross

INVENTORS
Earl L. Schulman and
Adam C. Beiler.
BY Frederick Shapoe
ATTORNEY

Patented May 17, 1949

2,470,653

UNITED STATES PATENT OFFICE 2,470,653

RESISTANCE THERMOMETER

Earl L. Schulman and Adam C. Beiler, Pittsburgh, Pa., assignors to Westinghouse Electric Corporation, East Pittsburgh, Pa., a corporation of Pennsylvania Application January 10, 1948, Serial No. 1,655

5 Claims. (Cl. 201—63)

This invention relates generally to resistance thermometers and more particularly to a resistance thermometer having a resistance element with a predetermined temperature coefficient of electrical resistance.

Resistance thermometers are widely used in dynamoelectric machines for measuring the temperature of the coils of the machine, and are frequently used in conjunction with expensive automatic temperature indicating and recording devices. As is well known, the determination of temperature by a resistance thermometer depends on the temperature coefficient of resistance of the material of which the element is formed; that is, on the change of resistance with the change of temperature, expressed in ohms per ohm per degree centigrade. Inasmuch as fine cooper wire has been universally used as the resistance element in resistance thermometers for dynamoelectric machines, recorders and indicating devices used in conjunction with such resistance elements are calibrated for a selected temperature coefficient of resistance of copper. Inasmuch as the temperature coefficient of resistance of copper varies slightly with temperature, an average value of the temperature coefficient between 0° C. and 100° C. is used in calibrating the automatic devices to record and indicate the temperature. This value is about $4.26 \times 10^{-3}$ ohms per ohm per degrees centigrade.

In order to provide sufficient resistance for accurate measurement, the total resistance of the resistance element is usually made about 10 ohms. Inasmuch as copper has a low electrical resistance, a resistance element made of this metal to have the required 10 ohms resistance for accurate temperature measurement, must be made of fine wire of considerable length. For example, it is common to use a No. 33 copper wire which requires a length of about 48 feet to give the required resistance. In the manufacture of such resistance elements, the wire, due to its great length must be formed into loops or coils so that the resulting member will be of such a size that it may be readily inserted between the coils of the dynamoelectric machine. Such resistance elements frequently fail in service due to contact or short circuiting of the individual coils or loops during manufacture or installation which decreases the total resistance of the element thereby resulting in inaccurate temperature indication and renders the element useless.

To provide a resistance thermometer having the required resistance of 10 ohms in a relatively short length of wire, thereby reducing or eliminating coiling, it is necessary that the material of which the resistance element is formed have a high specific resistance. Furthermore, to enable the thermometer to be used in replacing copper resistance thermometers used in conjunction with automatic temperature indicating devices, it is necessary that the resistance element have a temperature coefficient of resistance equal to that of copper between 0° C. and 100° C.

The object of the invention is to provide a resistance element for a resistance thermometer having a high specific electrical resistance and a temperature coefficient of resistance equal to that of copper between 0° C. and 100° C.

A further object of the invention is to provide a resistance thermometer having a resistance element disposed in an insulating thermoset resin to provide a member of predetermined shape to facilitate its incorporation in the windings of an electrical machine.

Figure 2:
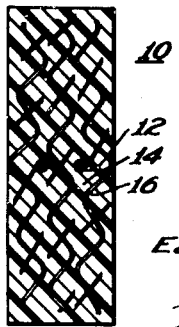

Other objects of this invention will become apparent from the following description, taken in conjunction with the accompanying drawing, in which:

Figure 1 is a view partly in section and partly in side elevation of a resistance thermometer embodying the features of the invention, and Fig. 2 is a view in cross-section on line II—II of Fig. 1.

Most pure metals have relatively low specific resistances, but high temperature coefficients of resistance, as compared to their alloys which have higher resistances and lower temperature coefficients of resistance than the parent metals. A good example of this is nickel having a temperature coefficient of resistance of $6 \times 10^{-3}$ at 20° C. and copper having a temperature coefficient of resistance at 20° C. of $3.83 \times 10^{-3}$ and when combined in an alloy of 70% nickel and 30% copper have a temperature coefficient of resistance at 20° C. of only $7 \times 10^{-4}$ ohms per ohm per degree centigrade. Numerous other examples may be cited, however the phenomenon is so common that it has been stated generally in the literature that the temperature coefficient of resistance of an alloy is less than that of its constituents.

It has been found that certain high resistance alloys of iron, nickel and cobalt, with minor impurities, can be made to have a coefficient of resistance equal to that of copper by a proper proportioning of the alloying elements in conjunction with a suitable heat treatment. In particular, an alloy composed of between 28% and 31% nickel, 17.5% to 19.5% cobalt, and 0.2% to 0.5% manganese, 0.05% to 0.2% silicon, and 0.01% to 0.05% carbon with the remainder being iron can be made to have a temperature coefficient of resistance of $4.26 \times 10^{-3}$ ohms per ohm per degree centigrade by a heat treatment at from 800° to 1100° C. in a reducing and non-carburizing atmosphere.

A specific embodiment of the invention is presented in the following example:

An alloy of 28.9% nickel, 18.5% cobalt, 0.36% manganese, 0.08% silicon and 0.02% carbon was cold drawn into wire having a diameter of 0.007 inch. The alloy wire in this condition was found to have a temperature coefficient of resistance of $3.82 \times 10^{-3}$ ohms per ohm per degree centigrade. The wire was then annealed at a temperature of 1000° C. for one hour in an atmosphere of wet hydrogen, the atmosphere having a dew point of about 25° C. After annealing the wire was found to have a temperature coefficient of resistance of the required value of $4.26 \times 10^{-3}$ and a specific resistance of $42.4 \times 10^{-6}$ ohm-centimeters at 20° C. This specific resistance is approximately 25 times greater than that of copper. Although the specific example has disclosed the use of an atmosphere of wet hydrogen in the annealing process, it will be understood that other atmospheres of a reducing and non-carburizing nature may be used, such as an atmosphere of dissociated ammonia. If wet hydrogen is used, a dew point of between 0° C. and 60° C. is satisfactory. It is preferred to use a temperature of about 1000° C., but wire having the desired temperatures between 800° C. and 1100° C. The time of annealing necessary to impart the desired coefficient to the wire varies slightly with several factors such as the size of the wire, the temperature of annealing and variations in composition of the wire. It has not been possible to determine the exact quantitative effect of these variables on the annealing time, however, the annealing should be continued for a time sufficient to bring the temperature coefficient of resistance to a constant value. Twelve hours should be sufficient for most types of wire.

In varying the relative amounts of the constituents from the specific example disclosed, it has been found that the effect of slight increases in the amount of cobalt and nickel tend to increase the temperature coefficient and slight increases in the amount of manganese, silicon, or carbon tend to decrease the temperature coefficient.

Quantitatively, the relationship between the constituents which increase the coefficient, that is, nickel and cobalt, and the constituents which decrease the coefficient, manganese, silicon and carbon, which must be maintained to hold the same value of the temperature coefficient as that of the specific example above given may be expressed by the equation:

$$10 \times \%Ni + 12 \times \%Co = 159 \times \%Mn + 145 \times \%Si + 239 \times \%C$$

This equation is valid only with the ranges of composition hereinbefore disclosed. It enables the modification of the composition of Example I within the range given for the components of the alloy.

Referring now to Figure 1 of the drawing, there is illustrated an enlarged view in elevation and partly in section of a resistance thercmometer 10 embodying the features of the invention. In constructing the thermometer 10, a length of annealed wire 12 of sufficient length to provide 10 ohms resistance, is looped lengthwise over a narrow piece of cotton duck 14 impregnated with a thermosetting resin. The wire is then cemented in place on both sides of the fabric and covered with a layer 16 of paper which has been impregnated with a thermosetting resin. The layers 14 and 16 are then molded together by the application of pressure and heat which effects the curing of the resin, and provides a relatively rigid casing having a predetermined shape to facilitate its incorporation into a dynamoelectric machine.

The resin with which the layers 14 and 16 are impregnated may be any thermosetting resin having adequate insulating characteristics such as a phenolic resin, a polysiloxane resin or a resin derived from an unsaturated alkyd resin and a polymerizable monomer having the group $H_2C\!=\!C\!<$.

A resistance thermometer made in accordance with this invention can be utilized for temperature measurement in installations having an automatic temperature indicating or recording device which has been calibrated for use with a copper resistance thermometer. In addition, the improved thermometer is easier to construct than conventional resistance thermometers since a length of wire approximately $\frac{1}{25}$ as long is required to provide adequate resistance. The reduced length of wire eliminates the necessity of forming the thermometer of a plurality of coils or loops, thereby reducing the possibility of short circuiting the individual coils during manufacture or installation.

Since certain changes may be made in the above invention and different embodiments of the invention could be made without departing from the scope thereof, it is intended that all matter contained in the above description or taken in connection with the accompanying drawings shall be interpreted as illustrative and not in a limiting sense.

We claim as our invention:

1. A resistance thermometer comprising a resistance element disposed in a casing comprising an insulating thermoset resin to insulate the resistance element and to provide a member of predetermined shape, the resistance element being formed of an alloy of iron with from 28% to 31% nickel, 17.5% to 19.5% cobalt, 0.2% to 0.5% manganese, 0.05% to 0.2% silicon, and 0.01% to 0.05% carbon, the alloy having been formed into wire and annealed for about one hour at a temperature of between 800° C. and 1100° C. in a reducing, non-carburizing atmosphere, the resistance element having after annealing a specific resistance at least 25 times that of copper, and an average temperature coefficient of resistance between 0° C. and 100° C. substantially equal to that of copper between 0° C. and 100° C.

2. A resistance element for use in a resistance thermometer, the element being composed of an alloy of 28% to 31% nickel, 17.5% to 19.5% cobalt, 0.2% to 0.5% manganese, 0.05% to 0.2% silicon, 0.01% to 0.05% carbon, with the remainder iron, the alloy having been formed into wire and annealed for about one hour in a reducing non-carburizing atmosphere at a temperature of between 800° C. and 1100° C., the element having after annealing a specific resistance at least 25 times that of copper and an average temperature coefficient of resistance between 0° C. and 100° C. equal to that of copper between 0° C. and 100° C.

3. A resistance element for use in a resistance thermometer, the element being composed of an alloy of 29% nickel, 18.5% cobalt, 0.35% manganese, 0.1% silicon, 0.02% carbon, with the remainder iron, the alloy having been formed into wire and annealed in an atmosphere of wet hydrogen at a temperature of between 800° C. and 1000° C. for about one hour, the element having after annealing an average temperature coefficient of resistance between 0° C. and 100° C. of $4.26 \times 10^{-3}$ ohms per ohm per degree centigrade.

4. A resistance thermometer comprising a resistance element disposed in a casing comprising an insulating thermoset resin to insulate the resistance element and to provide a relatively rigid member of predetermined shape, the resistance element being formed of an alloy of 29% nickel, 18.5% cobalt, 0.35% manganese, 0.08% silicon, 0.02% carbon, with the remainder iron, the alloy having been formed into wire and annealed at a temperature of between 800° C. and 1000° C. in an atmosphere of hydrogen and water vapor, the wire having been annealed for a time sufficient to make its average temperature coefficient of resistance between 0° C. and 100° C. substantially equal to that of copper between 0° C. and 100° C.

5. A resistance element for use in a resistance thermometer the element being composed of an alloy of 29% nickel, 18.5% cobalt, 0.35% manganese, 0.1% silicon, 0.02% carbon, with the remainder iron, the alloy having been formed into wire and annealed in a reducing non-carburizing atmosphere at a temperature of between 800° C. and 1100° C. for a time sufficient to make its temperature coefficient of resistance equal to $4.26 \times 10^{-3}$ ohms per ohm per degree centigrade.

EARL L. SCHULMAN.
ADAM C. BEILER.

REFERENCES CITED

The following references are of record in the file of this patent:

UNITED STATES PATENTS

| Number | Name | Date |
|---|---|---|
| 1,385,740 | Armstrong | July 26, 1921 |
| 1,942,260 | Scott | Jan. 2, 1934 |
| 2,120,335 | Lederer | June 14, 1938 |

FOREIGN PATENTS

| Number | Country | Date |
|---|---|---|
| 858,810 | France | Dec. 4, 1940 |